July 17, 1956  H. F. OLTZ  2,754,664
ICE CREAM FREEZER
Filed March 12, 1954
*FIG.1.*
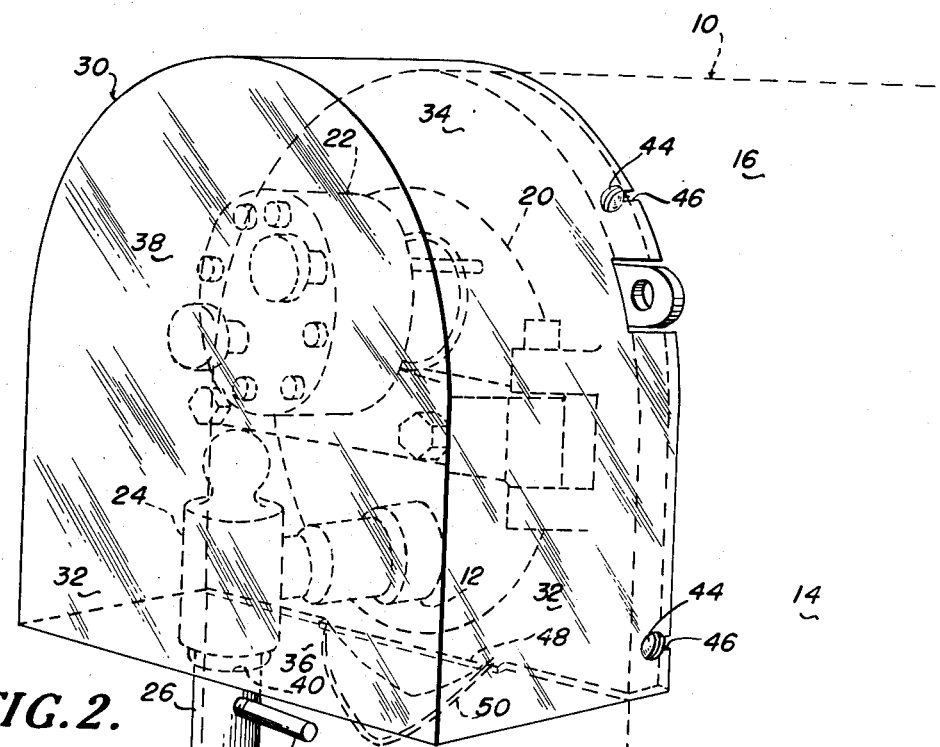
*FIG.2.*
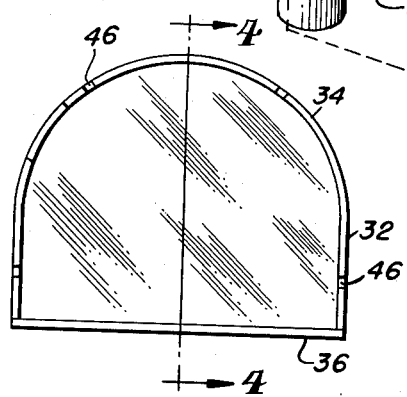
*FIG.4.*
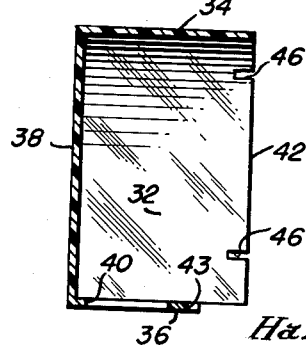
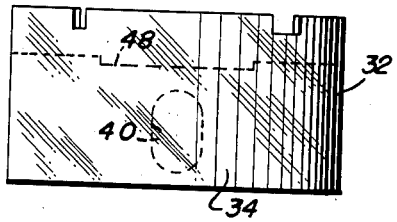
*FIG.3.*
INVENTOR
*Harold F. Oltz*
BY
*Cushman, Darby & Cushman*
ATTORNEYS

United States Patent Office 2,754,664
Patented July 17, 1956

2,754,664

ICE CREAM FREEZER

Harold F. Oltz, Miami, Fla., assignor to Ar-Tik Systems, Inc., Miami, Fla., a corporation of Indiana Application March 12, 1954, Serial No. 415,846

4 Claims. (Cl. 62—114)

The present invention relates to improvements in ice cream freezers or the like and, more particularly, to a device for shielding and insulating the dispensing valve for the front of an ice cream freezer of the type used to dispense frozen custards, ice cream, frozen malts, or the like.

Machines for dispensing or vending a frozen confection are well known in the art and usually consist of a supply reservoir for a liquid mix, and a freezing container having a freezing cylinder therein for receiving the liquid mix and delivering a frozen product. The freezing container is usually provided at one end thereof with a draw-off valve which an operator actuates to dispense the frozen product.

Since the frozen product within the cylinder of the freezing container chills the front of the container and also the draw-off valve, the atmosphere which comes in contact with the outer surface of the valve and the front of the container will condense and cause moisture to be formed thereon. The moisture will drip from the machine and the draw-off valve and cause an unsightly appearance and an unsanitary condition. Further, the warm air coming in contact with the draw-off valve will cause the frozen product in the draw-off valve to melt and, thus, when the draw-off valve is operated to dispense a quantity of the frozen products, the first portion of the product delivered, as known in the trade, will be wet and soft. Consequently, it is necessary for the operator to discard or tap off this portion of the product dispensed until a dry product is dispensed. In other words, to maintain a constant consistency of the product dispensed, it is necessary for the operator to waste a certain amount of the product first delivered which has melted in the draw-off valve.

An object of the present invention is to provide an ice cream freezer with a hood or shield which insulates the draw-off valve from the atmosphere whereby the frozen product within the draw-off valve will remain in its dry state or frozen condition.

A further object of the present invention is the provision of a hood or shield which insulates the draw-off valve and the front of the freezer whereby they will be protected from drafts which tend to melt the product in the valve and in the forward portion of the freezer.

A still further object of the present invention is the provision of a hood or shield covering and enclosing the frozen portion of the freezer and the draw-off valve which will cause a heavy coating of frost to be developed on the draw-off valve and on the front of the freezer. The heavy coating of frost on the draw-off valve and the front of the freezer further acts to prevent melting of the frozen product in the valve and in the freezer.

Still another object of the present invention is the provision of a hood or shield member enclosing the front of the freezing container and the draw-off valve which is manufactured of a transparent material so that the operator may by visual inspection observe the draw-off valve and any other equipment mounted on the front of the machine.

A still further object of the present invention is the provision of a hood or shield covering the draw-off valve which will prevent the valve from dripping in between servings. In valves used to draw off a frozen product, there is a tendency for them to drip in between servings because of the contact with the atmosphere which causes the valve to warm up and melt the product therein. The present invention eliminates dripping between servings.

Still another object of the present invention is the provision of a hood or shield covering the front of the freezer and the draw-off valve which will have a neat and pleasing appearance and will protect the valve and front of the freezer from dirt and dust.

These and other objects of the invention will be apparent from the following specification, claims and drawings in which:

Figure 1 is a perspective view of a freezer incorporating the hood or shield of the present invention;

Figure 2 is a front eleavtional view of the hood or shield;

Figure 3 is a top plan view of the hood disclosed in Figure 2, and

Figure 4 is a cross sectional view of the hood on the line 4—4 of Figure 2.

Referring to the drawing and, more specifically, to Figure 1, a freezing container 10 is disclosed and is of the type having an inlet for liquid mix (not shown) and an outlet 12 for a frozen product. The freezing container 10 is provided with a freezing cylinder therein having suitable rotating beater elements and suitable refrigerating means for freezing the liquid mix into a frozen product. The liquid mix may be supplied to the freezing cylinder of container 10 by any suitable means such as an automatic feed control dependent upon delivery of the frozen product therefrom.

As shown, the freezing container 10 is provided with side walls 14, a semi-circular top wall 16 and end walls 18. However, the particular configuration of the freezing container does not form a part of the present invention because the invention may be used with any type of freezer having a draw-off valve.

Mounted on the front end wall 18 of container 10 is a door 20 which permits entry to the interior of the freezer for the purpose of cleaning the same as often as necessary. The outlet 12 as a matter of convenience is provided in the lower portion of the door 20. Other control means for the freezing container 10 generally indicated 22 may be mounted on the front wall 18.

Connected to and communicating with the outlet 12 is a draw-off valve 24 such as disclosed in my copending application Serial No. 379,578 filed September 11, 1953. Draw-off valve 24 is a rotary plug type valve having a nozzle 26 extending downwardly therefrom. The nozzle 26 is connected to the rotary plug and turns integral with the rotary plug when the valve 24 is operated. In order that valve 24 may be operated, a handle or hand lever 28 is detachably connected to nozzle 26 and extends radially therefrom. Operation of handle 28 will cause rotation of nozzle 26 and the plug within valve 24 to open or close the valve.

A hood or shield member generally indicated 30 is mounted on container 10 so as to enclose at least a portion of the front wall 18 of the container as well as the entire structure of the dispensing valve 24. The shield member 30 is preferably made of transparent material so that the valve and front of the freezer will be visible to the operator at all times, and is generally of the same cross sectional configuration as the cross sectional configuration of container 10.

In the preferred embodiment of shield member 30, it will be noted that the shield includes side walls 32 extending outwardly from the container 10 in a plane parallel to the side walls 14 of the container, a semi-circular top wall 34 connecting the side walls and extending outwardly from the container 10, a bottom wall 36 also connecting the side walls 32 and extending outwardly of the container 10, and a front wall 38 connected to the top wall 34, side walls 32 and bottom wall 36. The bottom wall 36 is provided with an aperture 40 through which a portion of the nozzle 26 connected to valve 24 extends. As will be noted from Figure 1, handle 28 of the nozzle 26 is detachably mounted to the nozzle externally of the hood so that the operator may open and close valve 24 while the hood is in place. The open rear portion of the hood 42 is adapted to be connected to container 10 in any suitable manner. As shown in Figure 1 the side walls 32 and top wall 34 of shield 30 are of greater width than the bottom wall 36 and, consequently, the container will telescope into a small portion of the shield 30 and the shield may be bolted thereto by means of the bolts 44 fitting through slots 46 in the walls of the shield. Any suitable cut outs in the rear edge of the top, side or bottom walls may be made to provide for projections or equipment on the surface of the front end portion 18 of container 10. As shown in Figure 1 a cut out portion 48 is provided in the rear edge of wall 36 so that the shield 20 will fit flush against the cabinet. Cut out 48 allows the shield to fit around the drip spout 50 located beneath the clean out door 20.

The advantages of the invention have been enumerated in the preceding objects, however, as stated before one of the primary advantages of the present invention is that the shield which has walls spaced from valve 24 provides a coating of frost over the enclosed portion of the front end 18 of container 10 and also over the outlet 12 and valve 24. The reason the coating of frost develops on the objects enclosed within the shield is that air is trapped within the enclosed area of the shield and this air becomes chilled by contact with the freezer and valve 24 and, consequently, any condensation on the valve 24 or the enclosed portion of the front end 18 will turn into frost rather than melt. Thus the valve 24 and the enclosed portion of the front end wall 30 will remain cold and the frozen product will not melt in between operation of the valve.

The terminology used in the specification is for the purpose of description and not limitation, the scope of the invention being defined in the claims.

I claim:

1. A device of the character described for freezing a liquid mix and dispensing it as a frozen product comprising a freezing container having end walls, an inlet for the liquid mix and an outlet for the frozen product, valve means mounted externally of said container on one of its end walls for dispensing the frozen product, said valve means including a downwardly depending discharge nozzle, an insulating shield mounted on said container and enclosing said valve means and at least a portion of the end wall on which said valve means is mounted, means for detachably mounting said shield member on said container, said shield member having its walls substantially spaced from said valve means and provided with an opening through which a portion of said discharge nozzle extends, and said shield member protecting said valve means from the atmosphere and therefore causing a coating of frost to be developed on said valve means and the portion of the end wall of said container which it encloses.

2. A device of the type described in claim 1 wherein said shield member is transparent so that said discharge valve is visible to the operator.

3. A device of the character described for freezing a liquid mix and dispensing it as a frozen product comprising a freezing container having an inlet for the liquid mix and an outlet for the frozen product, said freezing container having end walls with one of said end walls having the outlet therein, a dispensing valve connected to said outlet and having a downwardly depending discharge nozzle, a shield member connected to said freezing container and enclosing said valve and at least a portion of the end wall to which said valve is connected, said shield member being substantially the same cross sectional configuration as the cross sectional configuration as said container, said shield member including side walls extending outwardly from and in a plane parallel to the side walls of said container, a top wall connecting said side walls and extending outwardly from the top wall of said container, a bottom wall spaced from said top wall and connecting said side walls, said bottom wall extending outwardly from the end wall of said container, and a front wall connecting said top, end, and bottom walls, said bottom wall having an aperture therein through which a portion of said discharge nozzle extends.

4. A device of the type described in claim 3 wherein said nozzle is rotatably connected to said valve to operate the same and wherein a valve operating handle is connected to the portion of said nozzle which extends externally of the interior of said shield member.

References Cited in the file of this patent

UNITED STATES PATENTS

| | | |
|---|---|---|
| 1,768,186 | Vnuk | June 24, 1930 |
| 1,874,776 | Martin | Aug. 30, 1932 |
| 2,125,693 | Ralph | Aug. 2, 1938 |
| 2,282,662 | Lindsey | May 12, 1942 |
| 2,629,229 | Hull | Feb. 24, 1953 |